United States Patent
Huang et al.

(10) Patent No.: US 12,496,143 B2
(45) Date of Patent: Dec. 16, 2025

(54) SYSTEMS AND METHODS FOR DETECTING CATHETER DELIBERATE MOTION

(71) Applicant: St. Jude Medical, Cardiology Division, Inc., St. Paul, MN (US)

(72) Inventors: Hai Huang, Woodbury, MN (US); Orit Brimer Limor, Haifa (IL); Hana Boudlali, Blaine, MN (US); Ashish Bhargava, Woodbury, MN (US); Kristi Tanouye, Minneapolis, MN (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 0 days.

(21) Appl. No.: 18/585,693

(22) Filed: Feb. 23, 2024

(65) Prior Publication Data
US 2024/0285352 A1  Aug. 29, 2024

Related U.S. Application Data

(60) Provisional application No. 63/448,463, filed on Feb. 27, 2023.

(51) Int. Cl.
*A61B 34/20* (2016.01)
*A61B 5/06* (2006.01)

(52) U.S. Cl.
CPC .............. *A61B 34/20* (2016.02); *A61B 5/062* (2013.01)

(58) Field of Classification Search
CPC ......... A61B 34/20; A61B 5/062; A61B 5/113; A61B 5/7207; A61B 5/725; A61B 5/7264
See application file for complete search history.

(56) References Cited

U.S. PATENT DOCUMENTS

| | | |
|---|---|---|
| 9,113,807 B2 | 8/2015 | Koyrakh |
| 10,362,963 B2 | 7/2019 | Koyrakh et al. |
| 10,561,371 B2 | 2/2020 | Koyrakh et al. |

(Continued)

OTHER PUBLICATIONS

"International Search Report and Written Opinion Mailed on Jun. 5, 2024", 6 Pages.

(Continued)

*Primary Examiner* — Joel Lamprecht
(74) *Attorney, Agent, or Firm* — Billion & Armitage

(57) ABSTRACT

According to some embodiments of the present disclosure, a method for detecting deliberate motion of a catheter positioned within a patient and including a magnetic sensor includes collecting a plurality of first magnetic sensor samples. The method includes measuring a sensor position $P_0$ in 3D coordinates for each of the first magnetic sensor samples and measuring a sensor orientation for each of the first magnetic sensor samples. Measuring the sensor orientation includes generating a first vector $(P_0-P_1)$ and generating a second vector $(P_0-P_2)$ orthogonal to the first vector. The method includes removing a respiration motion frequency component from the from the plurality of first magnetic sensor samples with a signal processing filter. A running variance for each axis (x, y, z) of the $P_1$ and $P_2$ is computed. The method includes generating an output indicative of detected deliberate motion based on the computed running variance.

19 Claims, 7 Drawing Sheets

(56) References Cited

U.S. PATENT DOCUMENTS

| | | |
|---|---|---|
| 10,918,307 B2 | 2/2021 | Olson et al. |
| 11,918,334 B2 * | 3/2024 | Thompson .............. A61B 5/062 |
| 2013/0006100 A1 | 1/2013 | Shachar et al. |
| 2020/0129127 A1 | 4/2020 | Koyrakh et al. |
| 2021/0244484 A1 * | 8/2021 | Fischbach .............. A61B 5/068 |

OTHER PUBLICATIONS

Alfred, Franz, et al., "Electromagnetic Tracking in Medicine—A Review of Technology, Validation, and Applicat", IEEE Transactions on Medical Imaging, IEEE, USA, vol. 33, No. 8, Aug. 1, 2014 (Aug. 1, 2014), pp. 1702-1725, XP011554714, ISSN: 0278-0062, DOI: 10.1109/TMI.2014.2321777 [retrieved on Jul. 29, 2014].

* cited by examiner

SYSTEMS AND METHODS FOR DETECTING CATHETER DELIBERATE MOTION

CROSS-REFERENCE TO RELATED APPLICATIONS

This application claims benefit of priority to U.S. Provisional Patent Application No. 63/448,463, filed on Feb. 27, 2023, the entire disclosure of each of which is hereby incorporated by reference.

BACKGROUND

Various systems are known for determining the position and orientation (P&O) of a medical device in a human body, for example, for visualization and navigation purposes. One such system is known as an electrical impedance-based positioning system. Electrical impedance-based systems generally include one or more pairs of body surface electrodes (e.g., patches) outside a patient's body, a reference sensor (e.g., another patch) attached to the patient's body, and one or more sensors (e.g., electrodes) attached to the medical device. The pairs can be adjacent, linearly arranged, or associated with respective axes of a coordinate system for such a positioning system. The system can determine P&O by applying a current across pairs of electrodes, measuring respective voltages induced at the device electrodes (i.e., with respect to the reference sensor), and then processing the measured voltages.

Another system is known as a magnetic field-based positioning system. This type of system generally includes one or more magnetic field generators attached to or placed near the patient bed or other component of the operating environment and one or more magnetic field detection coils coupled with a medical device. Alternatively, the field generators may be coupled with a medical device, and the detection coils may be attached to or placed near a component of the operating environment. The generators provide a controlled low-strength AC magnetic field in the area of interest (i.e., an anatomical region). The detection coils produce a respective signal indicative of one or more characteristics of the sensed field. The system then processes these signals to produce one or more P&O readings associated with the coils (and thus with the medical device). The P&O readings are typically taken with respect to the field generators, and thus the field generators serve as the de facto "origin" of the coordinate system of a magnetic field-based positioning system. Unlike an electrical impedance-based system, where the coordinate system is relative to the patient on which the body surface electrodes are applied, a magnetic field-based system has a coordinate system that is independent of the patient.

A common use of the catheter position is for displaying a representation of the catheter with respect to cardiac geometries or other imaging of a region of interest in which the catheter is located. However, patient respiration and cardiac activity can make the displayed catheter appear to "move" with respect to the acquired cardiac geometries (or imaging), which are static. In order to reduce the apparent motion of the catheter with respect to these static geometries (or imaging) and provide a clinician with a more stable view, motion compensation may be utilized to correct for the effects introduced by patient respiration and cardiac activity.

Motion compensation (i.e., adaptive respiration compensation or cardiac activity compensation) requires periodic evaluation to update catheter compensation parameters. The periodic evaluation must be performed when there is no deliberate motion on the catheter (i.e., catheter movement caused by an operator). Deliberate motion is different from respiration motion (i.e., catheter movement caused by the patient's respiration) and cardiac motion (i.e., catheter movement caused by the patient's heart beating). If user deliberate motion is present during the evaluation period, flawed data will be inputted into the calculation of catheter compensation parameters, resulting in inappropriate motion compensation. It would therefore be beneficial to develop a method and/or system of detecting deliberate motion.

SUMMARY

According to some embodiments of the present disclosure, a method for detecting deliberate motion of a catheter positioned within a patient and including a magnetic sensor includes collecting a plurality of first magnetic sensor samples. The method includes measuring a sensor position $P_0$ in 3D coordinates for each of the first magnetic sensor samples and measuring a sensor orientation for each of the first magnetic sensor samples. Measuring the sensor orientation includes generating a first vector ($P_0$-$P_1$) and generating a second vector ($P_0$-$P_2$) orthogonal to the first vector. The method includes removing a respiration motion frequency component from the from the plurality of first magnetic sensor samples with a signal processing filter. A running variance for each axis (x, y, z) of the $P_1$ and $P_2$ is computed. The method includes generating an output indicative of detected deliberate motion based on the computed running variance.

According to some embodiments of the present disclosure, a method for detecting deliberate motion of a catheter positioned within a patient and including a magnetic position sensor includes calculating a baseline effective variance limit. Calculation of the baseline effective variance limit includes collecting a plurality of baseline magnetic sensor samples. Each of the plurality of baseline magnetic sensor samples including a baseline sensor position $P_0$ and a baseline sensor orientation. A first vector and a second vector are generated for each of the plurality of baseline magnetic sensor samples. The first vector having a first length and a tip $P_1$ and the second vector having a second length and a tip $P_2$. Calculation of the baseline effective variance limit includes removing a respiration motion frequency component from the $P_1$ and the $P_2$ with a signal processing filter and running a statistical formula for the first vector and the second vector of the plurality of baseline magnetic sensor samples. The method includes collecting a plurality of evaluation magnetic sensor samples and computing a running variance for each of the axes of the $P_1$ and the $P_2$. The method includes comparing the running variance for each of the axes of the $P_1$ and the $P_2$ to the baseline effective variance limit. The method includes generating an output indicative of the user deliberate motion if the running variance is greater than the baseline effective variance limit.

According to some embodiments of the present disclosure, a system for detecting a user deliberate motion of a catheter includes a catheter having a magnetic sensor. The system includes a magnetic transmitter assembly configured to detect a position and an orientation of the magnetic sensor. The system includes an electronic control unit configured to receive a plurality of baseline magnetic sensor samples. Each of the plurality of baseline magnetic sensor samples include a baseline sensor position and a baseline sensor orientation. The electronic control unit is configured to generate a first vector and a second vector for each of the plurality of baseline magnetic sensor samples, the first vector having a first length and a tip $P_1$ and the second vector having a second length and a tip $P_2$. The electronic control unit is configured to remove a respiration motion frequency component from the $P_1$ and the $P_2$ with a signal processing filter and calculate an effective variance limit for each axes of the $P_1$ and the $P_2$. The electronic control unit receives a plurality of magnetic sensor samples. Each of the plurality of magnetic sensor samples including the position and the orientation of the magnetic sensor. The control unit computes a running variance for each of the axes of the $P_1$ and the $P_2$ and compares the running variance for each of the axes of the $P_1$ and the $P_2$ to the effective variance limit for each of the axes of the $P_1$ and the $P_2$. The electronic control unit generates an output indicative of the user deliberate motion if the running variance is greater than the effective variance limit.

BRIEF DESCRIPTION OF DRAWINGS

This written disclosure describes illustrative embodiments that are non-limiting and non-exhaustive. Reference is made to illustrative embodiments that are depicted in the figures, in which.

DETAILED DESCRIPTION

Devices, systems, and methods for determining a catheter deliberate motion are described herein. The catheter includes a magnetic sensor configured to measure position data of the sensor and configured to measure orientation data of the sensor. The sensor position may be represented in 3D coordinates (x, y, z). The sensor orientation may be represented in quaternion form Q and may include generating two orthogonal vectors. A method for determining catheter deliberate motion may include collecting a plurality of magnetic sensor samples, each magnetic sensor sample including the sensor position and the sensor orientation at a given instant in time. The plurality of magnetic sensor samples may be filtered to remove respiration motion frequency components. The plurality of magnetic sensor samples may be inputted into a statistical formula, and a baseline effective variance limit of catheter motion may be generated. A running evaluation effective variance may be compared to the baseline effective variance limit. If the running evaluation effective variance exceeds the baseline effective variance limit, an output indicating the presence of user deliberate motion may be generated. If the running evaluation effective variance is less than the baseline effective variance limit, an output indicating no user deliberate motion may be generated. An output indicating a lack of deliberate motion may be utilized to initiate updating of catheter compensation values.

Figure 1:
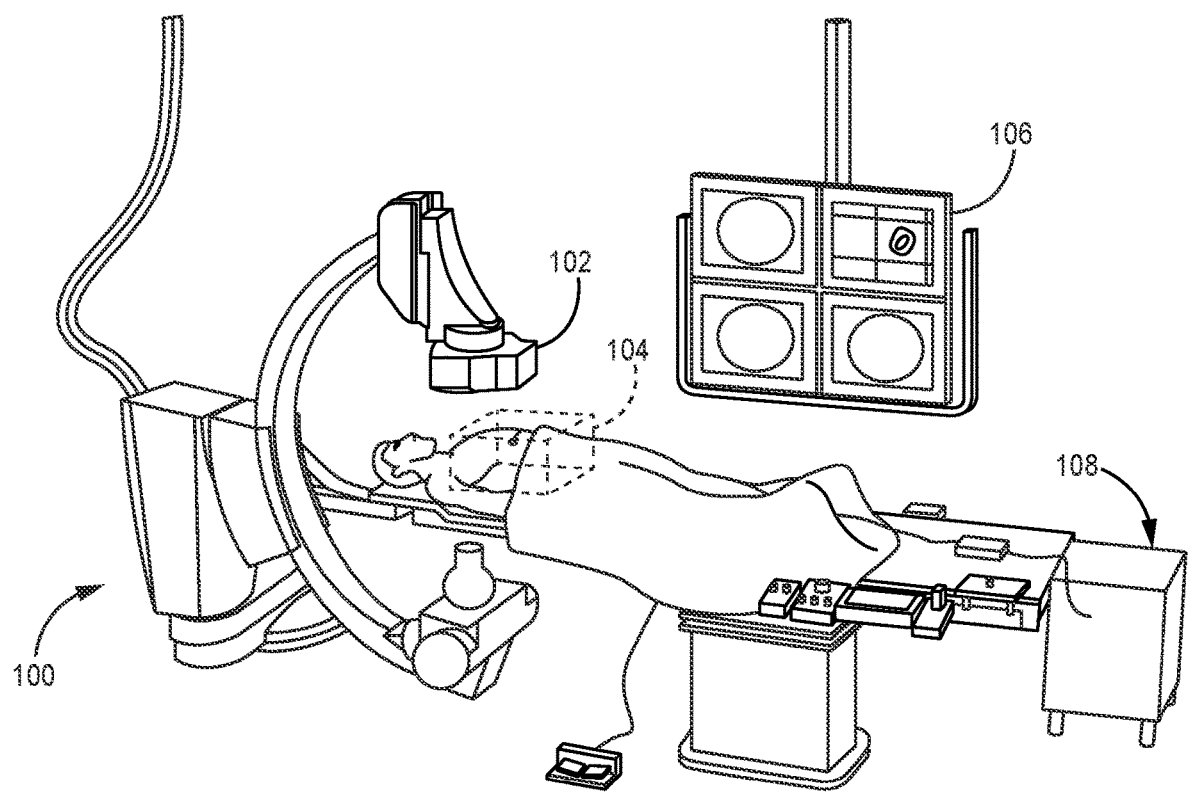
FIG. 1 illustrates a diagrammatic view of an exemplary magnetic field-based positioning system, according to some embodiments.

FIG. 1 is a diagrammatic view of an exemplary magnetic field-based embodiment of a medical positioning system (MPS) 100. The system 100 includes a magnetic transmitter assembly (MTA) 102 and a magnetic processing core 108 for determining P&O readings. The MTA 102 is configured to generate the magnetic field(s) in and around the patient's chest cavity in a predefined three-dimensional space designated as motion box 104 in FIG. 1. In some embodiments, the system 100 may measure magnetic field sensors coupled with a dual-system device, or another medical device are configured to sense one or more characteristics of the magnetic field(s) and, when the magnetic field sensors are in the motion box 104, each generates a respective signal that is provided to the magnetic processing core 108. The processing core 108 is responsive to these detected signals and is configured to calculate respective three-dimensional position and orientation (P&O) readings for each magnetic field sensor in the motion box 104. Thus, the magnetic field-based MPS system 100 enables real-time tracking of each magnetic field sensor in three-dimensional space. In some embodiments, the magnetic field-based MPS may include a three-dimensional coordinate system to provide real-time tracking of each magnetic field sensor. The position of the sensors may be shown on a display 106 relative to, for example only, a cardiac model or geometry.

In some embodiments, the magnetic field-based MPS 100 may be utilized with an electrical impedance-based positioning system, such as the electrical impedance-based positioning system described in commonly owned, U.S. Pat. No. 10,918,307 B2, entitled "Catheter navigation using impedance and magnetic field measurements", the contents of which are hereby incorporated by reference in their entirety. In some embodiments, the magnetic field-based MPS 100 may be implemented within a single processing unit with the electrical impedance-based positioning system. In other embodiments, the magnetic field-based MPS 100 may operate independent of the electrical impedance-based positioning system.

Figure 2:
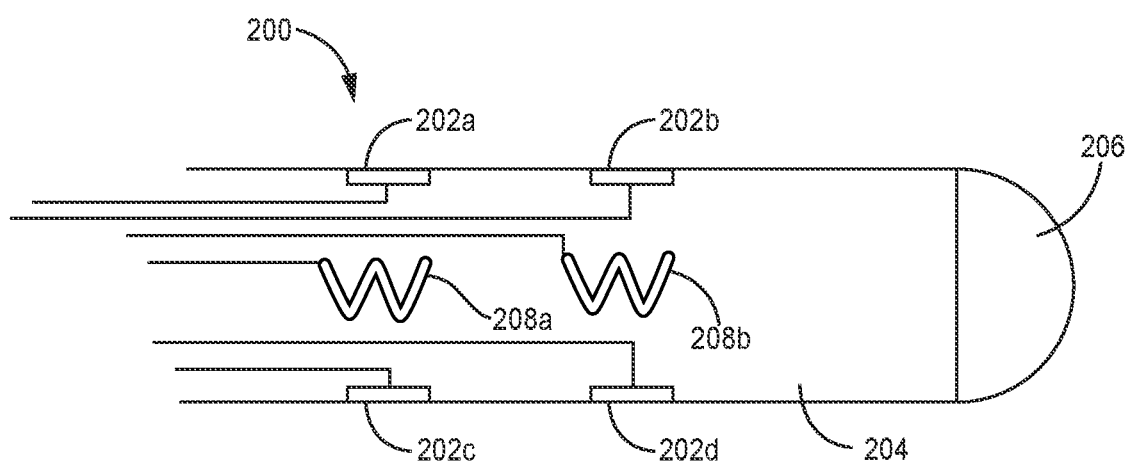
FIG. 2 illustrates a cross-sectional view of a portion of an exemplary medical device for use in the system of FIG. 1, according to some embodiments.

FIG. 2 illustrates a cross-sectional view of a portion of an exemplary medical device for use in the system of FIG. 1. In accordance with one aspect of the present teachings, a catheter 200 includes one or more magnetic position sensors 208a, 208b. In some embodiments, the catheter 200 further includes one or more electrical position sensors 202a, 202b, 202c, 202d (i.e., electrodes) utilized, for example, as part of an impedance-based positioning system. The catheter 200 may also include other conventional components not illustrated herein including but not limited to a temperature sensor, additional electrodes, corresponding conductors or leads, treatment devices, or other medical components. In the illustrated embodiment of FIG. 2, the catheter 200 includes an ablation tip electrode 206 at a distal end of a shaft 204.

The magnetic position sensors 208a, 208b may be provided for determining the position of the catheter 200 within the patient's body with a magnetic field-based MPS (e.g., the MPS 100). The magnetic position sensors 208a, 208b may communicate a sensor position in 3D coordinates (x, y, z) and may communicate a sensor orientation represented in quaternion form Q which may include generating two orthogonal vectors. In the embodiment illustrated in FIG. 2, the magnetic position sensors 208a, 208b are coils. As the magnetic position sensors 208 move within patient's body and within the magnetic field generated by the magnetic field-based positioning system 100, the current output of each sensor 208a, 208b may change, thereby indicating the location of the magnetic position sensors 208a, 208b within the magnetic field with a coordinate system established by the magnetic field-based MPS 100. The magnetic position sensors 208a, 208b may be wound about the catheter 200 at or near the distal end and may be embedded within the walls of the catheter 200 such that the magnetic position sensors 208a, 208b are insulated. Alternatively, the magnetic position sensors 208a, 208b could be embedded further within catheter 200 as shown in FIG. 2 or could be placed at other locations within the catheter 200. The magnetic position sensors 208a, 208b may also have appropriate insulation and/or shielding (e.g., a conductive foil or wire mesh) to cancel potential interferences from other devices near the patient's body. In some embodiments, the catheter 200 includes only a single magnetic position sensor (e.g., the magnetic position sensor 208b), while in other embodiments, the catheter 200 may include a plurality of magnetic position sensors (collectively "208"). The location(s) of the various magnetic position sensor(s) 208 on the catheter 200 may be configured to communicate a catheter path and/or a catheter tip orientation. For example, referring to FIG. 2, the MPS may measure the position of the magnetic position sensor 208a and measure the position of the magnetic position sensor 208b to determine the catheter path between the two magnetic position sensors 208a, 208b. In some embodiments, a magnetic position sensor may be positioned at or near the distal end of the shaft 204 to communicate the direction that the distal end if the shaft 204 is pointing.

The electrical position sensors 202a, 202b, 202c, 202d (collectively "202") may be provided for use in determining the position of the catheter 200 within a patient's body. The electrical position sensors 202 may be in electrical communication with an electrical impedance-based positioning system (distinct from the magnetic field-based MPS). In the illustrated embodiment, electrical position sensors 202 comprise electrodes and conventional ring electrodes located proximal to the distal end of catheter shaft 204 and tip electrode 206. As the electrical position sensors 202 move within the patient's body, voltage readings and/or impedance readings from electrical position sensors 202 change thereby indicating the location of electrical position sensors 202 within an electric field with a coordinate system established by the electrical impedance-based positioning system described above. It should be noted that in some embodiments, the electrical position sensors 202 may not contribute to the detection of user deliberate motion. The method of detecting user deliberate motion described below and illustrated in FIGS. 3-6 does not require electrical position sensors. However, in some embodiments, electrical position sensors may be incorporated into a method of detecting user deliberate motion.

It should be understood that the magnetic position sensors 208 may take forms other than the form illustrated in FIG. 2. The magnetic position sensors 208 may, for example, comprise any conventional position sensors for detecting changes in magnetic fields including Hall effect sensors, magnetoresistive sensors and sensors made from magnetoresistive materials and piezoelectric materials and the like. The magnetic position sensors 208 may communicate position signals to the magnetic processing core 108. In some embodiments, each of the magnetic position sensors 208 may be disposed proximate to a corresponding electrical position sensor 202 such that the detected position of one of the sensors 202, 208 may be indicative of the position of the other corresponding sensor 202, 208. For example, as illustrated in FIG. 2, the magnetic position sensor 208a is located proximate to, and is positioned between, the electrical position sensors 202a, 202c. The magnetic position sensors 208 may, for example be located from about 1.0 to about 3.0 millimeters from a corresponding electrical position sensor 202 and may be centered between two electrical position sensors 202 which may be spaced about 2.0 to 6.0 millimeters apart.

Figure 3:
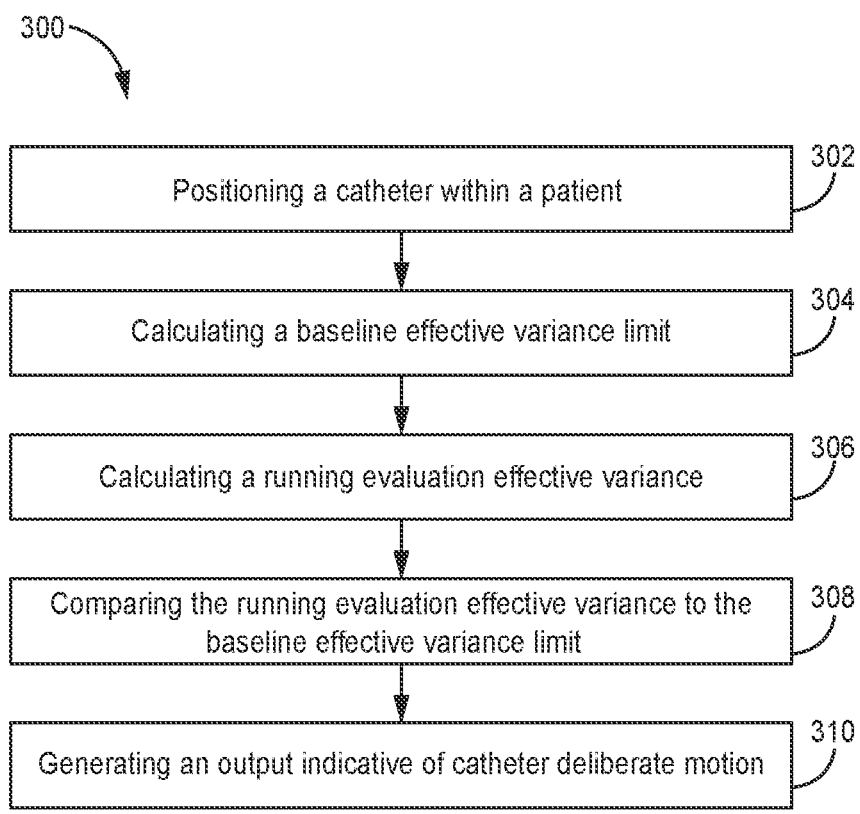
FIG. 3 illustrates a flow chart of a method of detecting user deliberate motion on a catheter, according to some embodiments.

FIG. 3 illustrates an exemplary method of detecting user deliberate motion on a catheter. In some embodiments, the method 300 may include the magnetic field-based MPS system 100 described above and the catheter 200 including magnetic position sensors 208 described above. In some embodiments, at step 302, the catheter is positioned, which may include inserting a magnetic sensor enabled catheter (e.g., the catheter 200 including the magnetic position sensor(s) 208 described above) into a patient's body. In some embodiments, the catheter may be inserted into the patient's femoral artery and/or radial artery. The catheter may be navigated through a patient's vasculature to a target area, e.g., an area adjacent to cardiac tissue.

In some embodiments, at step 304, a baseline effective variance limit is calculated. The baseline effective variance limit is a threshold of catheter motion, that when exceeded, indicates a user deliberate motion is present. For example, if catheter motion variance measured during a medical procedure and the measured catheter motion variance is greater than the baseline effective variance limit, a user deliberate motion of the catheter is present. The baseline effective variance limit may be calculated through a calibration process and/or statistical formula. The step 304 may include collecting a plurality of baseline magnetic sensor samples of the magnetic sensor enabled catheter. The step 304 may require the user to not touch the catheter (i.e., remove all user deliberate motion) throughout the duration of the step 304. In some embodiments, the method 300 may include generating an output instructing the user to not touch or move the catheter during the calculation of the baseline effective variance limit. If the user/operator applies a force to the catheter during the step 304, flawed data may be inputted into the calculation of the baseline effective variance limit, resulting in inappropriate detection of user deliberate motion. In other words, the step 304 may include collecting a plurality of baseline magnetic sensor samples when only respiration motion and/or cardiac motion are present.

In some embodiments, at step 306, a running evaluation effective variance is calculated. The running evaluation effective variance is a measurement of catheter motion during a running evaluation period. For example, during a medical procedure involving a catheter having a magnetic position sensor (e.g., the magnetic position sensor 208a), the motion of the magnetic position sensor, including position data and orientation data, may be used to calculate the running evaluation effective variance.

In some embodiments, at step 308, the running evaluation effective variance is compared to the baseline effective variance limit. In some embodiments, the step 308 may include a direct comparison of whether the running evaluation effective variance is greater than or less than the baseline effective variance limit. In other embodiments, a statistical formula, one or more thresholds, or other mathematical methods may be used to compare the running evaluation effective variance to the baseline effective variance limit.

In some embodiments, the step 308 occurs during, or directly preceding, a periodic adaptive respiration compensation parameter evaluation period. The periodic adaptive respiration compensation parameter evaluation period is a period of time wherein the catheter collects data and inputs the collected data to adaptive respiration compensation systems. The adaptive respiration compensation systems generate updated respiration compensation parameters. The periodic adaptive respiration compensation parameter evaluation period and adaptive respiration compensation systems are described in commonly owned, U.S. Patent Pub. No. 2020/0129127, filed on Dec. 23, 2019, and entitled "Dynamic Adaptive Respiration Compensation with Automatic Gain Control", the contents of which are incorporated by reference in their entirety. In some embodiments, the step 306, may occur on a running buffer period (e.g., a running 12-second buffer), and the running evaluation effective variance is continuously updated and compared to the baseline effective variance (step 308).

In some embodiments, at step 310, an output indicative of catheter deliberate motion may be generated. If the running evaluation effective variance exceeds the baseline effective variance limit, the output indicative of catheter deliberate motion will be "YES". If the running evaluation effective variance is less than the baseline effective variance limit, the output indicative of catheter deliberate motion will be "NO". In some embodiments, the output indicative of catheter deliberate motion may be displayed on the display 106. In some embodiments, the output indicative of catheter deliberate motion may be inputted into other systems, methods, and/or equations in the magnetic processing core 108 or CPU. For instance, if the output indicative of catheter deliberate motion is "YES", the magnetic processing core 108 or CPU will not use the data collected during that period for periodic adaptive respiration compensation parameter evaluation. Conversely, if the output indicative of catheter deliberate motion is "NO", the magnetic processing core 108 or CPU may use the data collected during that period to initiate periodic adaptive respiration compensation parameter evaluation.

Figure 4:
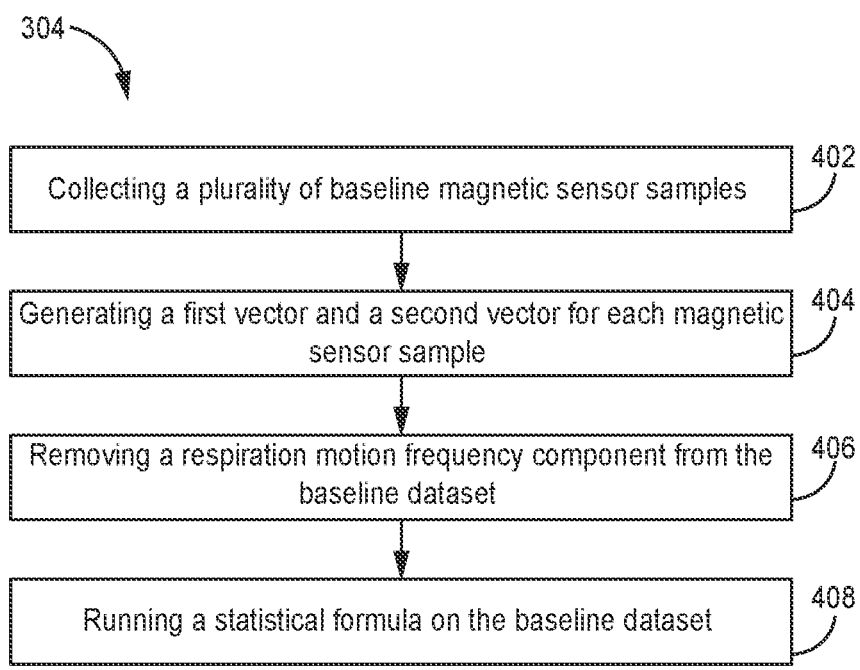
FIG. 4 illustrates a flow chart of a method of calculating the baseline effective variance limit of FIG. 3, according to some embodiments.

FIG. 4 illustrates a flowchart of the step 304, providing in more detail steps utilized to calculate a baseline effective variance value. In some embodiments, calculating the baseline effective variance limit may include, at step 402, collecting a plurality of baseline magnetic sensor samples. Each of the plurality of baseline magnetic sensor samples may include a baseline sensor position and a baseline sensor orientation. The baseline sensor position may be represented by point $P_0$, which communicates the position of a magnetic sensor (e.g., the magnetic position sensor 208) in three-dimensional cartesian coordinates (x, y, z) at a particular instant. The baseline sensor orientation may be represented in quaternion form Q and/or may be represented by two orthogonal vectors ($P_0$-$P_1$) and ($P_0$-$P_2$) originating at point $P_0$. As the patient inhales, the magnetic position sensor may move in 3D space, causing the baseline sensor position $P_0$ and the baseline sensor orientation to fluctuate over time. In some embodiments, the plurality of baseline magnetic sensor samples may be collected by the magnetic field-based MPS 100 and stored in the processing core 108. The step 402 may include collecting a plurality of baseline magnetic sensor samples per second to track collect a plurality of baseline sensor positions $P_0$ and baseline sensor orientations over time. In some embodiments, the step 304 may include collecting a plurality of baseline magnetic sensor samples at a baseline sample rate of between 90 Hz and 110 Hz, optionally a sample rate of between 50 Hz and 150 Hz, and optionally a sample rate of between 25 Hz and 250 Hz. In some embodiments, the plurality of baseline magnetic sensor samples may be communicated and/or stored in a central processing unit (CPU) (e.g., the magnetic processing core 108 described above). The step 402 may run for a baseline collection sample duration. In some embodiments, the baseline collection sample duration may be measured in seconds, e.g., a 12-second baseline sample. In other embodiments, the baseline collection sample duration may require a minimum threshold amount of baseline magnetic sensor samples, e.g., 1,200 baseline magnetic sensor samples. In other embodiments, the baseline collection sample duration may require a minimum threshold amount of a patient's respirations, e.g., a minimum of three full inhalations In some embodiments, at step 404, a first vector and a second vector for each baseline magnetic sensor sample may be generated. For each of the plurality of magnetic sensor samples collected, two orthogonal vectors ($P_0$-$P_1$) and ($P_0$-$P_2$) may be generated. The point $P_0$ represents the location of the magnetic sensor. The points $P_1$ and $P_2$ can be derived from the rotation matrix m of the quaternion Q. For each magnetic sensor sample, the points $P_1$ and $P_2$ are generated (put into x, y, z coordinates) and stored in the CPU. In some embodiments, the points $P_1$ and $P_2$ have a length (or distance from point $P_0$) of 10 mm. In other embodiments, the length of the points $P_1$ and $P_2$ may range from 1 mm to 100 mm. In some embodiments, a third orthogonal vector $P_0$-$P_3$ may be generated, however, the third orthogonal vector is the cross product of the first two orthogonal vectors.

Figure 5:
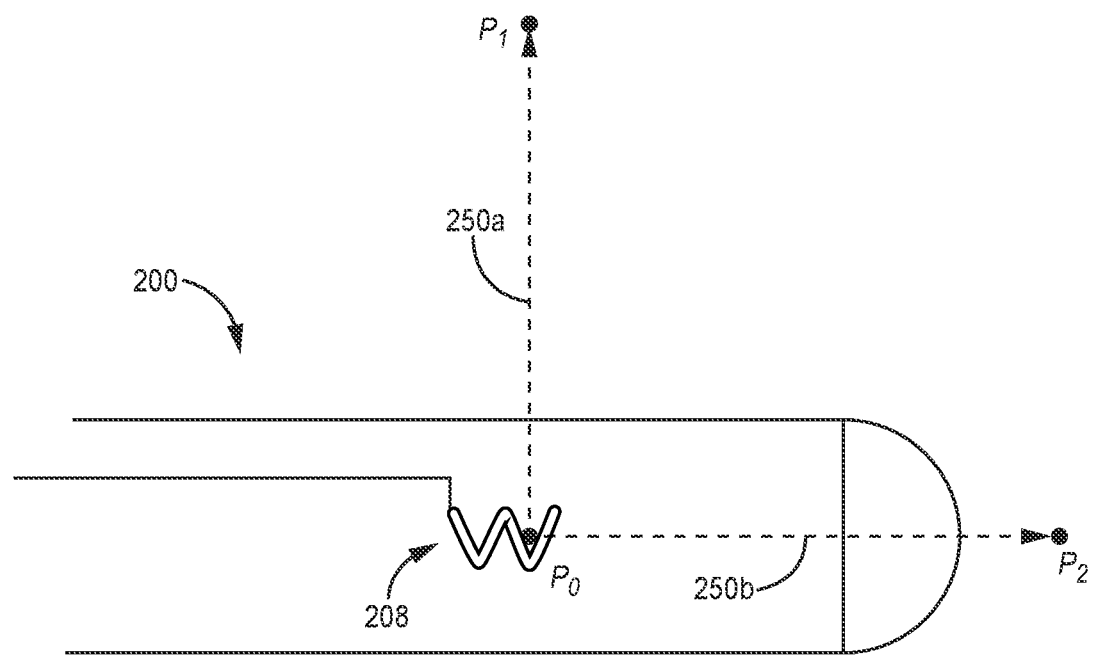
FIG. 5 illustrates a cross-sectional diagrammatic view of a catheter with two orthogonal vectors originating from a magnetic position sensor, according to some embodiments.

FIG. 5 illustrates an exemplary catheter 200 having a magnetic position sensor 208 at the point $P_0$ and two orthogonal vectors 250a, 250b extending therefrom. The orthogonal vector 250a extends from ($P_0$-$P_1$) and the orthogonal vector 250b extends from ($P_0$-$P_2$). If the shaft of the catheter 200 rotates, the vector 250a will rotate with the rotation of the catheter 200, causing the point $P_1$ to travel in (x, y, z) coordinates. And if the tip of the catheter 200 is steered/oriented, the point $P_2$ will travel in (x, y, z) coordinates. Thus, the two orthogonal vectors 250a, 250b are configured to communicate the sensor orientation, as the rotation about the shaft of the catheter and the direction of which the catheter is pointed is reflected in the points $P_0$, $P_1$ and $P_2$. In some embodiments, the magnetic position sensor 208 may be disposed at, or near, the distal tip of the catheter 200. In some embodiments, the catheter 200 may include a plurality of magnetic position sensors 208, each of the magnetic position sensors 208 generating the two orthogonal vectors 250a, 250b.

In some embodiments, at step 406, a respiration motion frequency component may be removed from the baseline dataset. The step 406 may include sending the plurality of baseline magnetic sensor samples to a filter. The plurality of baseline magnetic sensor samples may be collectively referred to as the baseline dataset, wherein each of the baseline magnetic sensor samples includes the points $P_0$, $P_1$ and $P_2$. In some embodiments, the filter is a band-stop filter configured to remove the respiration frequency motion components. The band-stop filter may be configured to remove the respiration motion frequency within a certain frequency range, e.g., between 0.15 Hz to 0.33 Hz at 100 Hz sample rate. In other words, respiration frequency components between 9 breaths per minute and 20 breaths per minute are removed by the band-stop filter. In other embodiments, a high pass filter may be used to remove the respiration frequency components below 0.33 Hz. In some embodiments, the band-stop or high pass filter may be configured to continuously adapt to the patient's breath rate. For instance, if the patient's breath rate is 15 breaths per minute, the band-stop filter may adapt to remove respirate frequency components of 0.25 Hz with an error range of +/−0.05 Hz, and thus, the stop-band filter adapts to remove respiration frequency components within a frequency range of 0.20 Hz and 0.30 Hz.

In some embodiments, at step 408, a statistical formula may be applied to the baseline dataset. The step 408 may include calculating the baseline effective variance limit (BEVL) with the plurality of baseline magnetic sensor samples (i.e., the baseline dataset). In other words, once the baseline collection sample duration is complete, the stored magnetic sensor position data $P_0$ and the stored magnetic sensor orientation data $P_1$ and $P_2$ are used to calculate the effective variance limit of each axis (x, y, z) of $P_1$ and $P_2$ using the following formula:

$$BEVL(P_i, \text{axis}) = rt * bv(P_i, \text{axis}) \quad \text{(Eq. 1)}$$

where:

$$rt = ((1 - rvt) * bv(P_i, \text{axis}) + rvt * iv_{max} - iv_{min})/(iv_{max} - iv_{min})$$

$$P_i = <P_1, P_2>$$

$$\text{axis} = <x, y, z>$$

$rt$ = Relative Threshold $bv$ = Baseline Varience $rvt$ = Relative Varience Threshold $iv_{max}$ = Initial Variance Maximum $iv_{min}$ = Initial Variance Minimum In some embodiments, the relative variance threshold (rvt), the initial variance maximum ($iv_{max}$), and the initial variance minimum ($iv_{min}$) are predetermined values that may be adjusted to control the sensitivity and/or boundaries of the baseline effective variance limit calculation. The baseline variance (bv) is the variance ("variance" is a term of art in statistics meaning the expectation of the squared deviation of a random variable from its population mean) of the baseline dataset for each axis (x, y, z) of $P_1$ and $P_2$.

Figure 6:
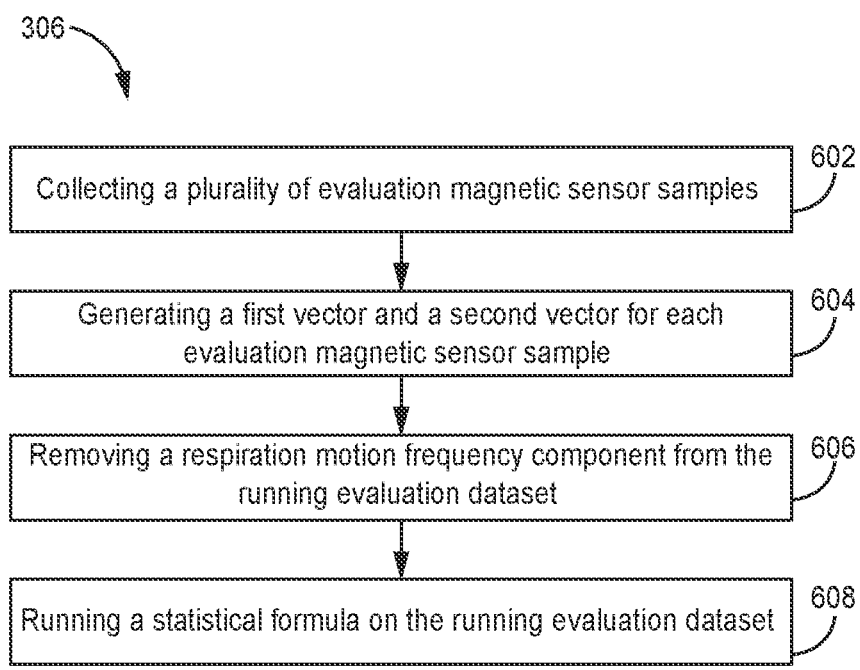
FIG. 6 illustrates a flow chart of a method of calculating the running effective variance of FIG. 3, according to some embodiments.

FIG. 6 illustrates a flowchart of step 306. In some embodiments, the step 306 follows a similar process to step 304, namely in collection of a plurality of magnetic sensor samples (steps 402 and 602), generating two orthogonal vectors for each magnetic sensor sample (steps 404 and 604), and removing a respiration motion frequency component from the datasets (steps 404 and 606). For instance, the step 602 may include collecting a plurality of evaluation magnetic sensor samples (collectively the "evaluation dataset"). Each of the plurality of evaluation magnetic sensor samples include an evaluation sensor position $P_0$ and an evaluation sensor orientation represented in quaternion form Q and/or represented by two orthogonal vectors ($P_0$-$P_1$) and ($P_0$-$P_2$). The step 604 may include generating two orthogonal vectors for each of the evaluation magnetic sensor samples. The generation of two orthogonal vectors may include the same process(es) described above in step 404 and/or in FIG. 5. The step 606 may include filtering the respiration frequency components from the evaluation dataset using the systems, processes, and/or devices described above in step 406.

In some embodiments, at step 608, a statistical formula may be used on the running evaluation dataset. The statistical formula may include calculating the running variance, i.e., the variance (the expectation of the squared deviation of a random variable from its population mean) of each axis (x, y, z) of $P_1$ and $P_2$. In some embodiments, the running variance may be weighted by other variables or set values.

Figure 7:
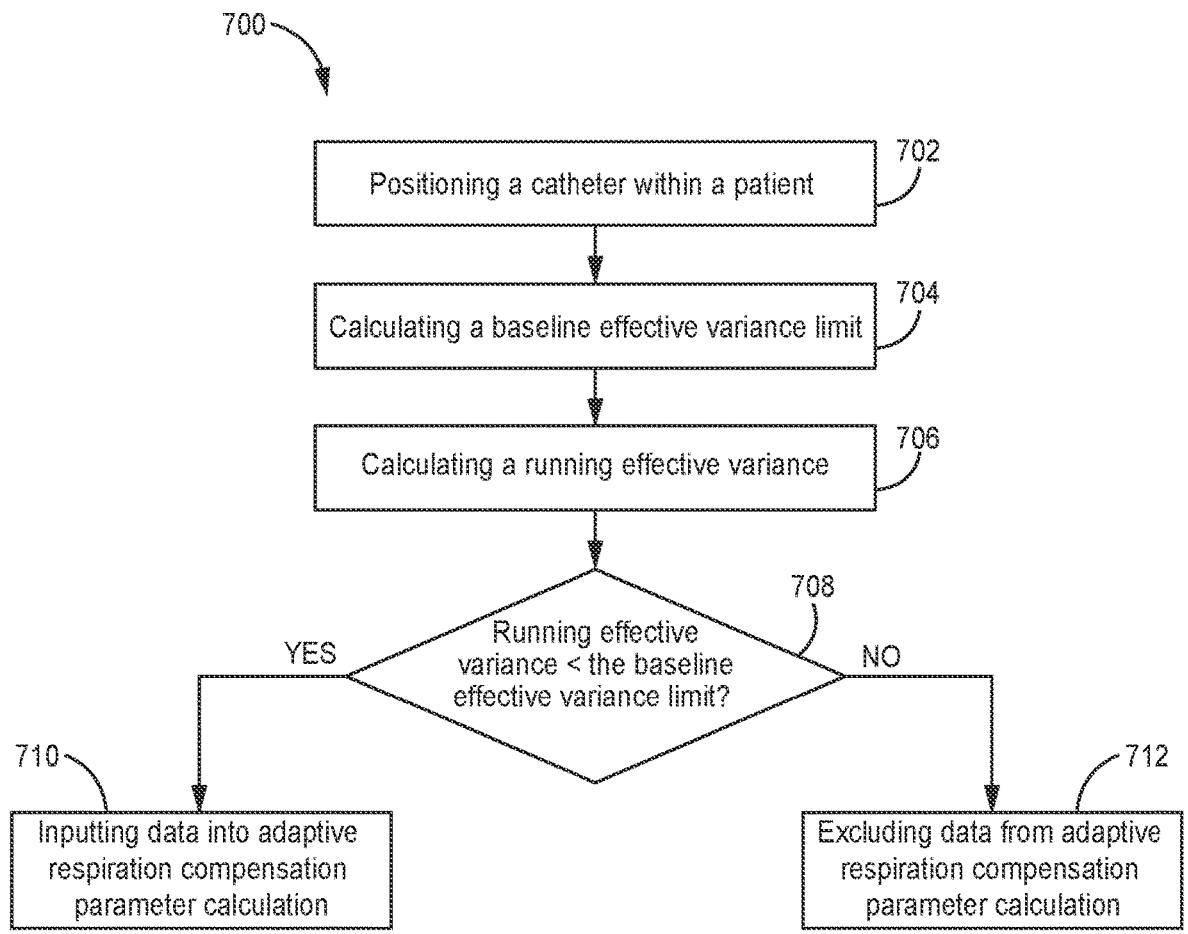
FIG. 7 illustrates a flow chart of a method of adaptive respiration compensation with user deliberate motion detection, according to some embodiments.

FIG. 7 illustrates a flow chart of a method of adaptive respiration compensation with user deliberate motion detection, according to some embodiments. In some embodiments, at step 702, a catheter may be positioned within a patient. The step 702 may include inserting a magnetic sensor enabled catheter (e.g., the catheter 200 described above) into a patient's body. In some embodiments, the catheter may be inserted into the patient's femoral artery and/or radial artery. The catheter may be navigated through a patient's vasculature to a target area, e.g., an area adjacent to cardiac tissue. Adaptive respiration compensation and adaptive respiration compensation parameter evaluation is described in commonly owned, U.S. Pat. No. 10,271,810, filed on Apr. 2, 2014, and entitled "Enhanced Compensation of Motion in a Moving Organ Using Processed Reference Sensor Data", and W.O. Patent Pub. No. 2021/161093, filed on Dec. 31, 2020, and entitled "Respiration Compensation", the contents of which are hereby incorporated by reference in their entirety.

In some embodiments, at step 704, a baseline effective variance limit may be calculated. The step 704 may include the steps described above in FIGS. 3-5. For instance, step 604 may include collecting a plurality of baseline magnetic sensor samples (step 402), generating a first vector and a second vector for each magnetic sensor sample (step 404), removing a respiration motion frequency component from the baseline dataset (step 406), and running a statistical formula on the baseline dataset (step 408).

In some embodiments, at step 706, a running effective variance may be calculated. The step 706 may include the steps described above in FIGS. 3-6. For instance, step 706 may include collecting a plurality of evaluation magnetic sensor samples (step 602), generating a first vector and a second vector for each magnetic sensor sample (step 604), removing a respiration motion frequency component from the evaluation dataset (step 606), and running a statistical formula on the baseline dataset (step 608).

In some embodiments, at step 708, a determination is made whether the running effective variance is less than the baseline effective variance limit. The step 708 which may include determining whether the running effective variance is greater than, or less than, the baseline effective variance limit. If the running effective variance is less than baseline effective variance limit, the data collected by the magnetic position sensor during the running buffer period may be inputted into an adaptive respiration compensation parameter function (step 710). However, if the running effective variance is greater than baseline effective variance limit, the data collected during the respective buffer period may be excluded from the adaptive respiration compensation parameter calculation (step 712). Thus, in the course of a medical procedure, the adaptive respiration compensation parameters may be automatically updated whenever user deliberate motion is removed for the duration of a buffer period (e.g., for 12 seconds).

While the disclosure has been described with reference to an exemplary embodiment(s), it will be understood by those skilled in the art that various changes may be made, and equivalents may be substituted for elements thereof without departing from the scope of the embodiment(s). In addition, many modifications may be made to adapt a particular situation or material to the teachings of the embodiment(s) without departing from the essential scope thereof. Therefore, it is intended that the disclosure is not limited to the disclosed embodiment(s), but that the disclosure will include all embodiments falling within the scope of the appended claims. Various examples have been described. These and other examples are within the scope of the following claims.

What is claimed is:

1. A method for detecting deliberate motion of a catheter positioned within a patient and including a magnetic sensor, the method comprising:
   calculating a baseline effective variance limit, including:
      collecting a baseline dataset, the baseline dataset including plurality of baseline magnetic sensor samples from the magnetic sensor, each of the baseline magnetic sensor samples including a baseline sensor position $P_0$ and a baseline sensor orientation $P_1$ and $P_2$,
      removing a respiration motion frequency component from the baseline dataset with a signal processing filter,
      computing a baseline variance for each axis (x, y, z) of $P_1$ and $P_2$,
      wherein the baseline effective variance limit is a threshold above the baseline variance for each axis (x, y, z) of $P_1$ and $P_2$,
   storing the baseline effective variance limit in an electronic control unit (ECU);
   collecting a plurality of first magnetic sensor samples from the magnetic sensor;
   measuring a sensor position $P_0$' in 3D coordinates for each of the first magnetic sensor samples;
   measuring a sensor orientation for each of the first magnetic sensor samples, wherein measuring the sensor orientation includes generating a first vector $(P_0-P_1)$' and generating a second vector $(P_0-P_2)$' orthogonal to the first vector with the ECU;
   removing a respiration motion frequency component from the plurality of first magnetic sensor samples with the signal processing filter;
   computing a running variance for each axis (x, y, z) of the first vector $(P_0-P_1)$' and the second vector $(P_0-P_2)$' with the ECU;
   detecting deliberate motion of the catheter when the computed running variance is greater than the baseline effective variance limit stored within the ECU; and
   generating an output indicative of deliberate motion when the ECU detects deliberate motion of the catheter.

2. The method of claim 1, wherein measuring the baseline sensor orientation includes generating the first vector $(P_0-P_1)$ and generating the second vector $(P_0-P_2)$ orthogonal to the first vector.

3. The method of claim 1, wherein collecting a baseline dataset includes a buffer time period, the buffer time period having a duration of at least one patient breath length.

4. The method of claim 3, further comprising:
   generating an output instructing a user to not move the catheter during the calculation of the baseline effective variance limit.

5. The method of claim 1, wherein the first vector $(P_0-P_1)$' and the second vector $(P_0-P_2)$' each define a length, wherein the length of the first vector $(P_0-P_1)$' and the length of the second vector $(P_0-P_2)$' are equal.

6. The method of claim 1, wherein the signal processing filter is a band-stop filter including a stop-band frequency range of 0.10 Hz to 0.50 Hz.

7. The method of claim 1, wherein the signal processing filter is a high pass filter including a stop-band frequency range of 0.00 Hz to 0.33 Hz.

8. The method of claim 1, further comprising:
   inputting the output indicative of deliberate motion into an adaptive respiration compensation parameter calculation.

9. A method for detecting deliberate motion of a catheter positioned within a patient and including a magnetic position sensor, the method comprising:
   calculating a baseline effective variance limit, including:
      collecting a plurality of baseline magnetic sensor samples from the magnetic sensor, each of the plurality of baseline magnetic sensor samples including a baseline sensor position $P_0$ and a baseline sensor orientation, generating a first vector and a second vector for each of the plurality of baseline magnetic sensor samples, the first vector having a first length and a tip $P_1$ and the second vector having a second length and a tip $P_2$, removing a respiration motion frequency component from the $P_1$ and the $P_2$ with a signal processing filter,
      running a statistical formula for the first vector and the second vector of the plurality of baseline magnetic sensor samples;
   storing the baseline effective variance limit in an electronic control unit (ECU);
   collecting a plurality of evaluation magnetic sensor samples from the magnetic sensor;
   computing a running variance for each of axes of the $P_1$ and the $P_2$ with the ECU;
   comparing the running variance for each of the axes of the $P_1$ and the $P_2$ to the baseline effective variance limit stored in the ECU;
   determining user deliberate motion is present with the ECU based on whether the running variance is greater than the baseline effective variance limit; and
   generating an output indicative of deliberate motion when the ECU determines deliberate motion of the catheter is present.

10. The method of claim 9, wherein collecting a baseline dataset further includes maintaining a running sample buffer for each of the axes of the $P_1$ and the $P_2$.

11. The method of claim 10, wherein the running sample buffer has a duration of at least one patient breath length.

12. The method of claim 11, wherein collecting a baseline dataset further includes computing a running mean and the running variance for each of the axes of the $P_1$ and the $P_2$.

13. The method of claim 12, wherein collecting a baseline dataset includes removing the user deliberate motion for the duration of at least one patient breath length.

14. The method of claim 9, wherein the first vector oriented orthogonal to the second vector.

15. The method of claim 14, wherein the first vector includes a first origin disposed at the sensor position, and the second vector includes a second origin disposed at the sensor position.

16. The method of claim 15, wherein the first length is equal to the second length.

17. The method of claim 9, wherein the signal processing filter is a band-stop filter with a stop band frequency range of 0.10 Hz to 0.50 Hz.

18. The method of claim 9, wherein the signal processing filter is a high pass filter with a stop band frequency range of 0.33 Hz and below.

19. A system for detecting a user deliberate motion of a catheter, comprising:
- a catheter including a magnetic sensor;
- a magnetic transmitter assembly configured to detect a position and an orientation of the magnetic sensor; and
- an electronic control unit configured to:
  - receive a plurality of baseline magnetic sensor samples, each of the plurality of baseline magnetic sensor samples including a baseline sensor position and a baseline sensor orientation,
  - generate a first vector and a second vector for each of the plurality of baseline magnetic sensor samples, the first vector having a first length and a tip $P_1$ and the second vector having a second length and a tip $P_2$,
  - remove a respiration motion frequency component from the $P_1$ and the $P_2$ with a signal processing filter,
  - calculate an effective variance limit for each axes of the $P_1$ and the $P_2$;
  - receive a plurality of magnetic sensor samples, each of the plurality of magnetic sensor samples including the position and the orientation of the magnetic sensor;
  - compute a running variance for each of the axes of the $P_1$ and the $P_2$;
  - compare the running variance for each of the axes of the $P_1$ and the $P_2$ to the effective variance limit for each of the axes of the $P_1$ and the $P_2$;
  - determine user deliberate motion is present if the running variance is greater than the effective variance limit; and
  - generate an output indicative of deliberate motion when deliberate motion of the catheter is present.

* * * * *